US006327385B1

(12) United States Patent
Kamitani (10) Patent No.: US 6,327,385 B1
(45) Date of Patent: Dec. 4, 2001

(54) CHARACTER SEGMENTATION DEVICE AND CHARACTER SEGMENTATION SYSTEM

(75) Inventor: Masaaki Kamitani, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/189,874

(22) Filed: Nov. 10, 1998

(30) Foreign Application Priority Data

Nov. 10, 1997 (JP) .................................................... 9-307428

(51) Int. Cl.[7] ...................................................... G06K 9/34
(52) U.S. Cl. .......................................... 382/177; 382/179
(58) Field of Search .................................... 382/177, 174, 382/175, 176, 178, 179, 180, 107, 103, 199, 226, 227, 228, 173

(56) References Cited

U.S. PATENT DOCUMENTS

| 4,654,873 | * | 3/1987 | Fujisawa et al. ..................... 382/177 |
| 5,369,714 | * | 11/1994 | Withgott et al. ...................... 382/177 |
| 5,579,408 | * | 11/1996 | Sakaguchi et al. ................... 382/187 |
| 5,828,771 | * | 10/1998 | Bloomberg ............................ 382/112 |
| 5,943,443 | * | 8/1999 | Itonori et al. ......................... 382/225 |

FOREIGN PATENT DOCUMENTS 63-94386   4/1988 (JP) .

* cited by examiner

Primary Examiner—Andrew W. Johns
Assistant Examiner—Seyed Azarian (74) Attorney, Agent, or Firm—Ostrolenk, Faber, Gerb & Soffen, LLP (57) ABSTRACT

A character segmentation system for segmentation out a character from a string of characters which are in touch with each other, which is capable of being executed on a small size hardware resource without influence of variation of touching condition due to difference of character font, comprises an image storing unit 110 for storing an electronic image of character string obtained by such means as optical scanning, a partial pattern dictionary 122 for storing partial pattern shapes used as features for specifying fonts of character, a partial pattern detecting unit 121 for extracting areas of the image of character string, which coincide with a partial pattern, a character font determining unit 123 for determining the font of character on the basis of positions of the areas of the image of character string, which coincide with the partial pattern, and the number of the areas, a feature extraction inhibited area dictionary 132 for storing areas in which feature extraction processing for respective fonts of character is inhibited, a character separating feature extracting area defining unit 131 for defining areas of the image of character string, from which character separating features are to be extracted, by referring to the feature extraction inhibited area corresponding to the font of character determined by the character font determining unit, a character separating feature extracting unit 133 for extracting the character separating feature from the areas for extracting the character separating feature, a character boundary position detecting unit 134 for detecting positions at which characters are to be separated from each other and a control unit 140 for controlling operations of all of the constructive components.

24 Claims, 5 Drawing Sheets

CHARACTER SEGMENTATION DEVICE AND CHARACTER SEGMENTATION SYSTEM

CROSS REFERENCE TO RELATED APPLICATIONS

The present invention claims priority from Japanese Patent Application No. 9-307428 filed Nov. 10, 1997, the contents of which are incorporated herein by reference.

BACKGROUND OF THE INVENTION

1. Field of the Invention

The present invention relates to a character or letter segmentation technique in an optical character read-out device and, particularly, to a character or letter segmentation technique for segmenting out a character or letter in contact with an adjacent character or letter.

2. Description of Related Art

The character or letter segmentation technique is used in an optical character reader to segmentation out a character or letter to be sensed from an electronic picture obtained by For example; optical scanning. In this description, the term "character" means either a character or a letter. An example of the conventional character segmentation system is disclosed in Japanese Patent Application Laid-open No. Hei 8-129611. In the disclosed character segmentation system, a pattern of a specific character is preliminary registered as a reference character and the specific character is sensed by obtaining a correlation between the reference character and a string of characters which are in contact with the specific character.

An example of the conventional character segmentation position detecting system is disclosed in Japanese Patent Application Laid-open No. Hei 5-307640. According to the disclosed conventional character segmentation position detecting system, a picture is stored as monochromatic values and the confidence of character segmentation is improved by changing a binary threshold value according to the kind or font of character.

The conventional system disclosed in Japanese Patent Application Laid-open No. Hei 8-129611 is effective if the number of fonts of character is small. However, it has such problems as that, when a number of character fonts are to be read out, the registration work for the character patterns of the reference characters is troublesome and that the size of mechanism for storing the reference characters becomes large.

Further, since it is necessary in the character segmentation position detecting system disclosed in Japanese Patent Application Laid-open No. Hei 5-307640 to store a picture as monochromatic values, there is a problem that considerable resources such as memories are required.

Further, there is another problem in the conventional character segmentation method that the character segmentation tends to be influenced by variation of the touching case of characters due to the difference in font between characters.

SUMMARY OF THE INVENTION

An object of the present invention is to provide a character segmentation system to segment a character from other characters that are in touch with the character, which is free from the variation of character contacting state due to difference in font between the characters and realizable by using small size hardware resources.

A character segmentation device according to the present invention comprises an image storing unit for storing an electronic image of a character string obtained by means of for example an optical scanner; a partial pattern dictionary for storing shapes of partial patterns of the electronic image of the character string which are features for specifying character fonts; a partial pattern detecting unit for extracting areas coincident with the partial patterns from the image of the character string; a character font determining unit for determining the character font on the basis of positions of the areas matched with the partial patterns in the image of the character string and the number of the areas; a feature extraction inhibited area dictionary for storing areas of the image of the character string, in which extraction of features of respective character fonts is inhibited; a character separating feature extracting area defining unit for defining areas from which character separating features are extracted from the image of the character string by referring to the feature extraction inhibited areas corresponding to the determined character font; a character separating feature extracting unit for extracting the character separating features from the areas from which the character separating features are to be extracted; a character boundary position detecting unit for detecting a separation position of a character from the character separating feature, and a control unit for controlling operations of all of these constructive units.

A character segmentation method according to the present invention comprises the steps of storing an electronic image of a string of characters taken in by means of such as optical scanner, extracting areas matched with partial patterns from the image of the character string by using shapes of the partial patterns which become features for specifying the font of character and determining the font of character on the basis of positions of the areas matched with the partial patterns in the image of the character string and the number of the areas and defining area for extracting character separating features from the image of the character string according to the font of character thus determined, with reference to extraction inhibited areas of the image of the character string, extraction processing of features of respective character fonts in which are inhibited, extracting the character separating features from the area for extracting character separating features and detecting a separation position of a character from the extracted character separating feature.

The determination of the font of character may be performed by a pattern matching between the image of character string and the partial pattern or by morphology operation of a relation between the image of character string and the partial pattern and the detection of the character separating position may be performed by defining an area, which includes a blank portion of a projection profile of the character separating feature and is treated as a blank area, as to be the separating position.

Since, according to the present invention, the character separating feature in other area of the image of the character string than the area thereof in which contact of adjacent characters possibly occurs is extracted, the feature is not influenced by the touching case of character and it is possible to reliably quarry characters for a larger number of touching patterns than that possible in the conventional method.

Further, since, according to the present invention, the character segmentation is performed by determining the font of character on the basis of comparison of the partial pattern indicative of the feature of the font of character with the image of character string and extracting the separating feature extracting area corresponding to the font of character, there is no need of redundant character segmentation processing in which the pattern of a whole character is registered as the reference character and the correlation thereof is obtained. Therefore, a hardware therefor can be realized easily, so that it is possible to perform the character segmentation processing on a small size hardware at high speed.

BRIEF DESCRIPTION OF THE DRAWINGS

The above mentioned and other objects, features and advantages of the present invention will become more apparent by reference to the following description of the invention taken in conjunction with the accompanying drawings, in which:

FIGS. 7a and 7b illustrate a search processing of a character separating position after a masking, in which FIG. 7a shows an image after it has been masked, FIG. 7b is a projection profile of pixels.

DETAILED DESCRIPTION OF THE PREFERRED EMBODIMENTS

Figure 2:
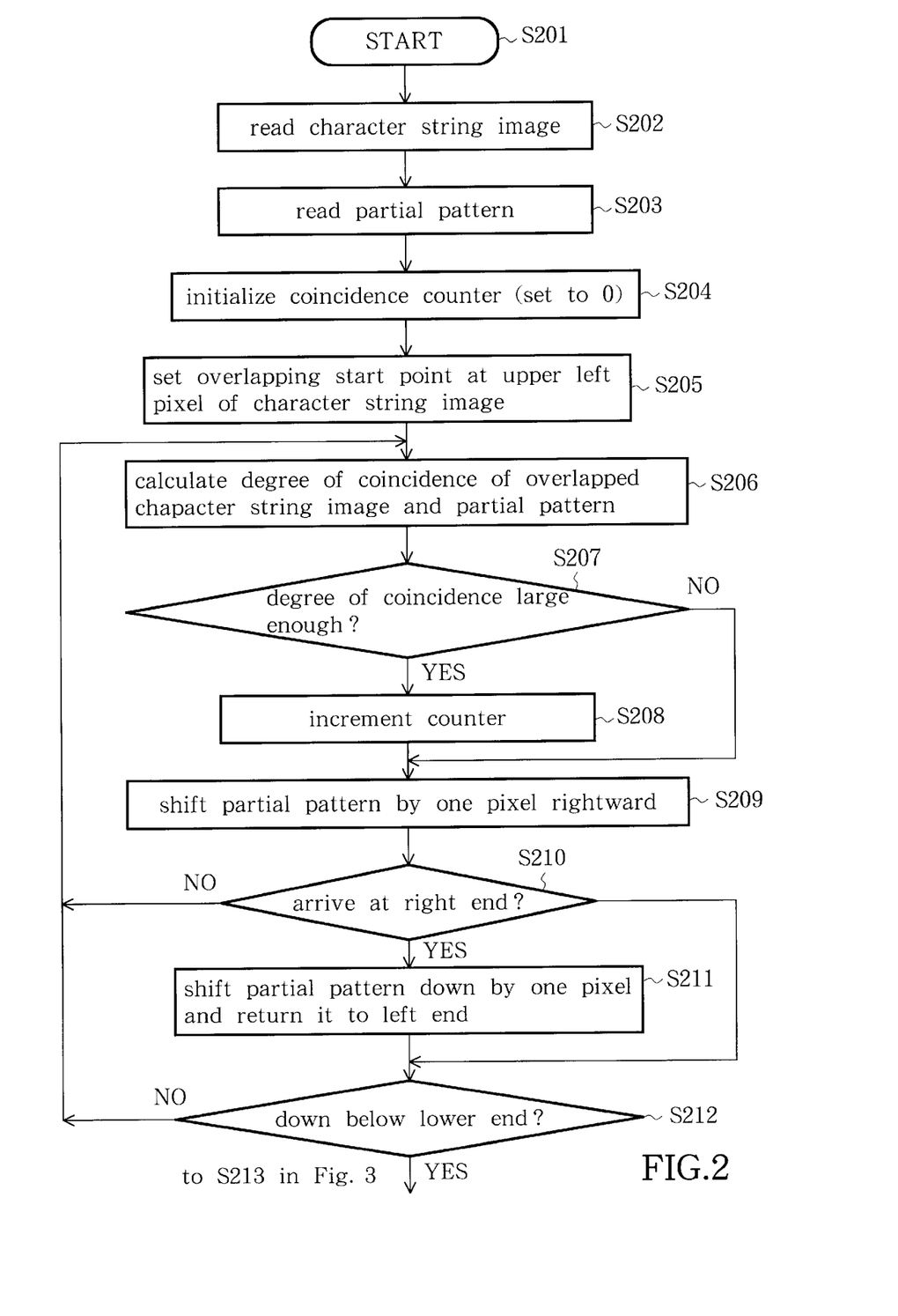
FIG. 2 is a first portion of a flowchart showing a character segmentation method of the present invention.
Figure 3:
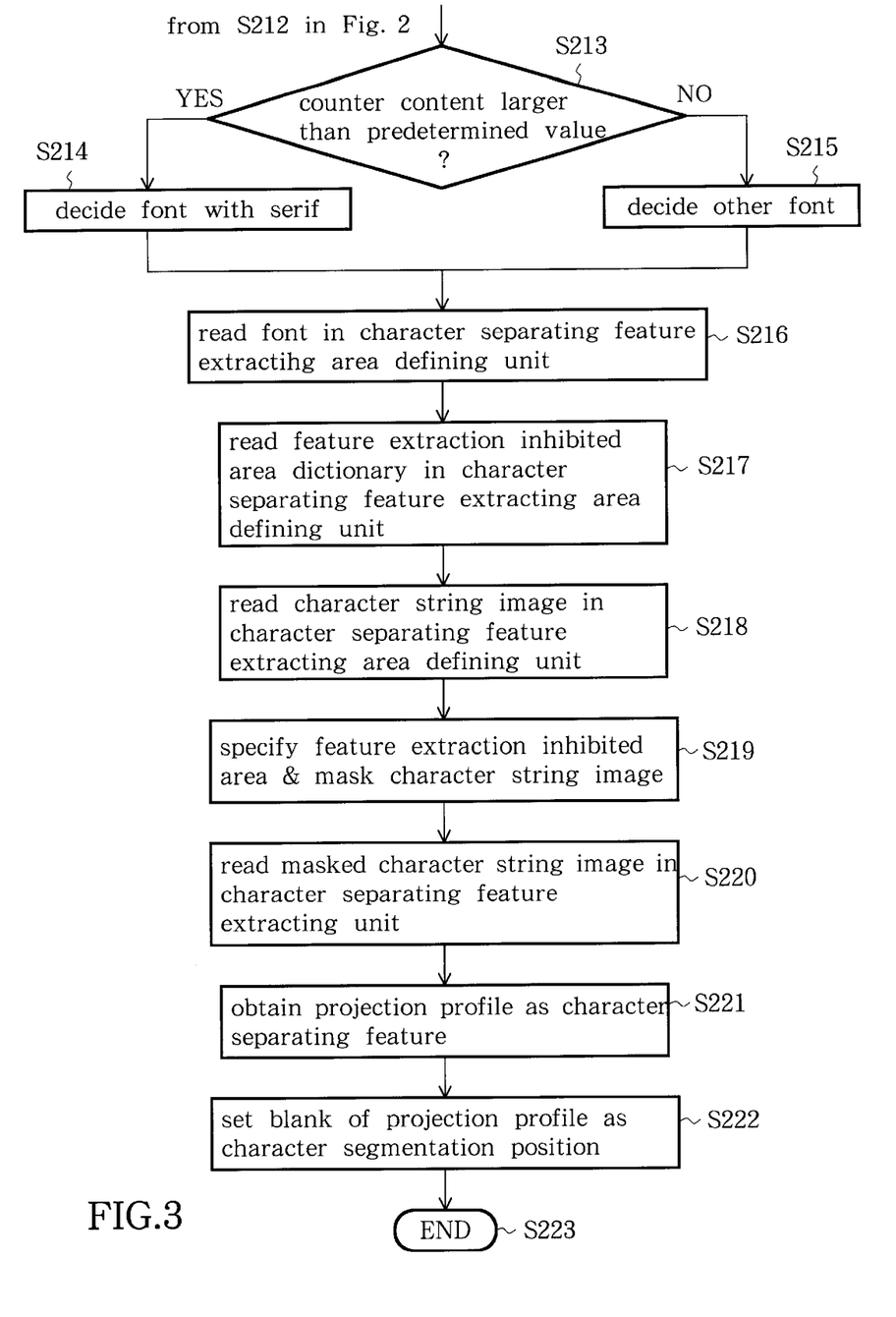
FIG. 3 is the remaining portion of the flowchart succeeding to the first portion shown in FIG. 2.

The character segmentation device and method according to the present invention will be described in detail with reference to FIG. 1, which is a block diagram showing a construction of a character segmentation device according to an embodiment of the present invention, FIG. 2, which is a first portion of a flowchart showing a character segmentation method of the present invention, and FIG. 3, which is the remaining portion of the flowchart succeeding to the first portion shown in FIG. 2.

Figure 1:
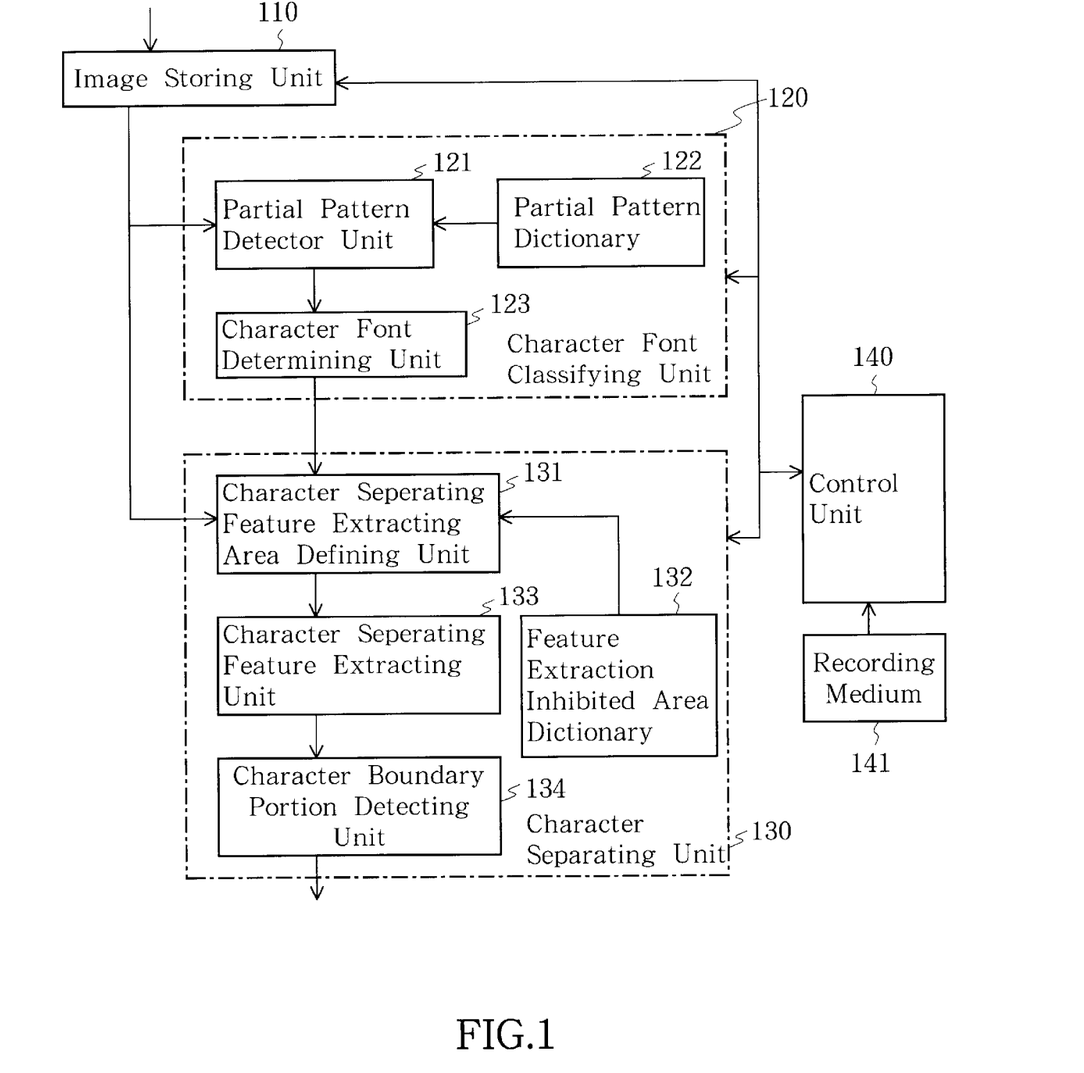
FIG. 1 is a block diagram showing a construction of a character segmentation device according to an embodiment of the present invention.

In FIG. 1, the character segmentation device includes: an image storing unit 110 for storing an electronic image of character strings obtained by, for example, as optical scanning; a character font classifying unit 120 for classifying character fonts of the electronic image of a character string stored in the image storing unit 110; a character separating unit 130 for detecting a character boundary position from the character font determined by the character font classifying unit 120, and a control unit 140 for controlling operations of all of the above mentioned units.

Referring to FIG. 1, the character font classifying unit 120 includes: a partial pattern dictionary 122 for storing partial patterns which become features for specifying the character font; a partial pattern detector unit 121 for extracting areas of the image of the character string, which has a shape matched with the partial pattern stored in the partial pattern dictionary 122 from the image of the character string, and a character font determining unit 123 for determining the character font on the basis of positions on the image of the character string matched with the partial pattern and the number of the areas.

The character separating unit 130 includes a feature extraction inhibited area dictionary 132 for storing, areas in which the feature extraction for those portions is inhibited in order to exclude areas of the image of the character string in which character touching may occur for respective character fonts, a character separating feature extracting area defining unit 131 for defining areas of the image of the character string from which the character separating features are to be extracted by excluding the feature extracting inhibiting areas according to the character font determined by the character classifying unit 120; a character separating feature extracting unit 133 for extracting the character separating feature from the areas from which the character separating features are to be extracted, and a character boundary position detecting unit 134 for detecting a separating position of the character according to the character separating features. The control unit 140 includes a mechanically readable recording medium 141 recorded with a program for executing operations of all of the above mentioned constructive components.

The image storing unit 110 stores electronic image of character string obtained by such as the optical scanning and quarried out by such as an optical character recognition (OCR) device with using the known character segmentation technique.

The partial pattern detecting unit 121 compares the partial pattern stored in the partial pattern dictionary 122 with the image of character string stored in the image storing unit 110 and detects an area in which the partial pattern in the partial pattern dictionary 122 is matched with the image of character string. This comparing processing between the image of the character string and the partial pattern may be performed by using the morphological operation or the pattern matching, etc.

The partial pattern dictionary 122 stores key shapes for specifying the fonts of character. The key shape may include a shape of serif or sweeping-up at an end portion or portions of a character, etc.

The character font determining unit 123 determines the font of character on the basis of positions of the partial patterns of the image of character string detected by the partial pattern detecting unit 121 and the number of the partial patterns.

In order to exclude the areas of the image of the character string, in which a touching between adjacent characters may occur, the feature extraction inhibiting area dictionary 132 stores the area, in which the feature extraction processing is not performed, for every font of character.

The character separating feature extracting area defining unit 131 specifies areas of the image of character string, for which the feature has to be not extracted, by referring to the font of character determined by the character font determining unit 123 and the feature extraction inhibited area dictionary 132 and masks the specified area stored in the image storing unit 110.

The character separating feature extracting unit 133 extracts character separating features from the image of character string whose areas in which the feature extraction is not performed are masked. As the character separating feature, separation to connected pixels by means of projection profile or labelling may be used.

The character boundary position detecting unit 134 specifies a separating position of a character from the character separating feature. In a case of the projective pattern, for example, the separating position can be specified by selecting positions of blank areas and/or valleys of the projective pattern.

The control unit 140 controls the operation of the whole character segmentation device including the detecting procedures of the partial pattern, the counting procedures of the partial patterns and the extraction procedures of the character separating features, etc.

Now, the operation of the character segmentation device shown in FIG. 1 will be described with reference to FIGS. 2 and 3.

When the operation is started (Step S201), the image of a character string stored in the image storing unit 110 is read into the partial pattern detecting unit 121 (Step S202). The partial pattern stored in the partial pattern dictionary 122 is also read in the partial pattern detecting unit 121 (Step S203). A counter (not shown) for counting the degree of coincidence therebetween is initialized, that is the, set to 0, (Step S204). An upper left portion of the image of the character string is set as a start point of overlapping (Step S205) and the degree of coincidence of overlapping of the image of character string and the partial patterns is calculated (Step S206). If the degree of coincidence is large (Yes in Step S207), the degree of coincidence counter is incremented (Step S208) and, further, the partial pattern is shifted on the image of character string by one pixel rightward (Step S209). If the degree of coincidence is not large enough (No in Step S207), the partial pattern is shifted on the image of character string by one pixel rightward (S209). The above mentioned operation is repeated until the partial pattern reaches a right end pixel (Yes in Step 210). When the partial pattern reaches the right end pixel, the partial pattern is shifted down by one pixel and returned to the left end of the image of character string (Step S211). When the partial pattern is not lowered beyond the lowermost end of the image of character string (No in Step S212), the operation is returned to the step S206 and the same calculation of the degree of coincidence is repeated. When the vertical level of the partial pattern becomes lower than the lowermost level (Yes in Step 212), it is determined whether or not the content of the degree of coincidence counter is larger than a predetermined value. When it is larger than the predetermined value, the font of character is determined as having serif (Step S214), otherwise, the font of character is determined as another (Step S215). The result of determination is read in the character separating feature extracting area defining unit 131 (step S216). Then, the feature extraction inhibited area dictionary is read in the character separating feature extracting area defining unit 131 (step S217) and the image of character string is read in the character separating feature extracting area defining unit 131 (step S218). The feature extraction inhibited areas of the image of character string thus read in are specified and are masked (step S219). The masked image of character string is read in the character separating feature extracting unit 133 (step 220) and the projection profile is obtained as the character separating feature (step S221). The character boundary position detecting unit 134 outputs a blank of the projection profile as the character segmentation position (step S222) and the operation is ended (step S223).

Figure 4:
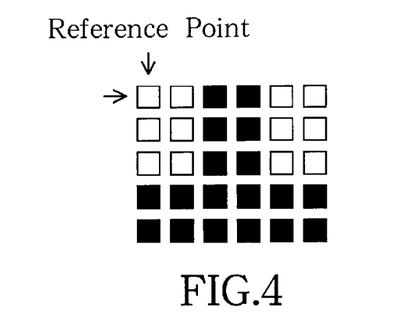
FIG. 4 illustrates an example of a partial pattern image.

Now, a concrete example of the embodiment of the present invention will be described with reference to FIGS. 4 to 7, in which the pattern matching system is used in detecting the partial pattern and the feature of the partial pattern registered in the partial pattern dictionary is assumed as a serif at a lower end of a stroke of a character as shown in FIG. 4. It should be noted, however, that it is possible to use other partial pattern detecting systems and other partial patterns than those mentioned above within the scope of the present invention.

Figure 5:
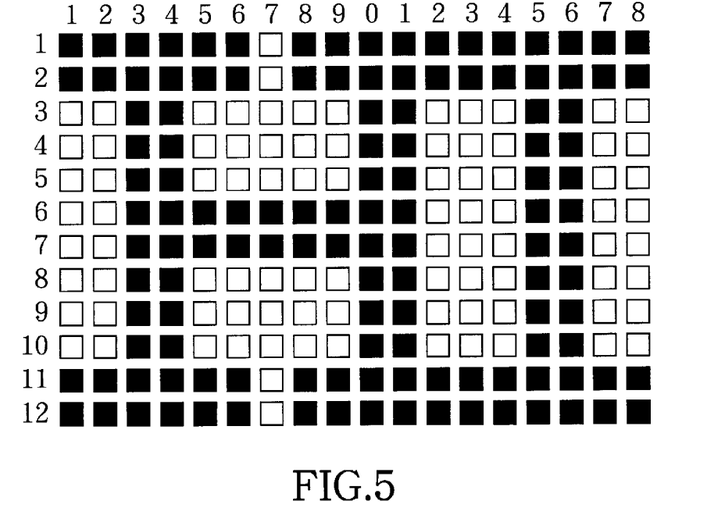
FIG. 5 illustrates an example of an image of a character string.
Figure 6:
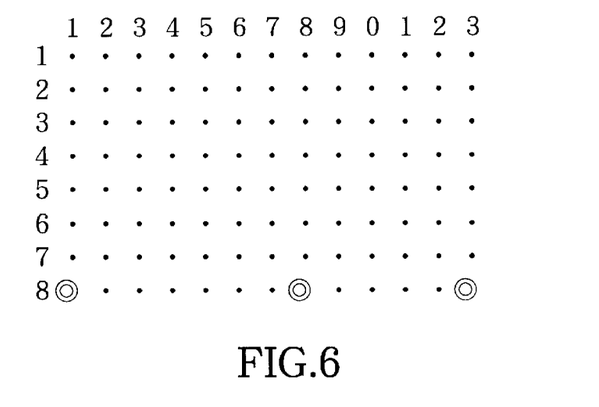
FIG. 6 showing points in which the image of a character string is matched with the partial pattern image.

As mentioned, FIG. 4 shows an example of a partial pattern. FIG. 5 shows an example of an image of a character string; FIG. 6 illustrates a location of the image of the character string at which the latter coincides with the partial pattern. FIG. 7a illustrates a search processing for the character separating location after the image of character string has been masked, in and FIG. 7b shows the projection profile of pixels.

First, the counter (not shown) for storing the degree of coincidence is initialized, that is, in this example, the counter is set to 0.

The calculating procedures of the degree of coincidence will be described. The frequency of occurrence of pixels which are superposed when the partial pattern image is laid on the image of character string and have the same values is obtained and, when the value of the frequency of occurrence is larger than a predetermined value, it is decided that the partial pattern image partially coincides with the image of that character string in that position and the value of the coincidence counter is incremented.

This will be described in more detail with reference to FIGS. 4 and 5 in which black square marks represent the character pixels and white square marks represent background pixels.

The degree of coincidence is checked by laying the reference point of the partial pattern image shown in FIG. 4 on the respective pixels of the image of character string shown in FIG. 5. It is clear from this checking that the partial pattern image shown in FIG. 4 coincides with the image of character string when the reference point of the partial pattern image is located at pixel coordinates (1, 8), (8, 8) and (13, 8), respectively, as shown in FIG. 5. That is, the partial pattern image coincides with the image of character string at double circled positions shown in FIG. 6.

This evaluation is performed on the entire pixels of the image of the character string while shifting the reference point of the partial pattern image and a total number of the locations at which the degree of coincidence is large is obtained by the degree of coincidence counter.

In the example shown in FIGS. 4 and 5, the content of the degree of coincidence counter after scanning the whole image of the character string is 3. When the content of the degree of coincidence counter is smaller than a reference value of the frequency of occurrence that is separately set, the font of the character is decided as character as Arial type or Gothic having no serif, it is otherwise, decided as Times Roman type or Ming type which has serif. For example, the font is determined as character having serif when the content of the degree of coincidence counter is equal to or larger than 1. According to this definition, the example shown in FIG. 5 is determined as character having serif. For example, a case where the font of character is determined as character having serif when the content of the degree of coincidence counter is equal to or larger than 10, the case shown in FIG. 5 is decided as a character having no serif.

Next, an embodiment of the present invention in which morphologic operation are used in detecting the partial pattern will be described. Morphology is a logic system including logical operations according to a set theory for deforming a picture in order to extract a feature from a binary or monochromatic picture. Morphology itself is described in, for example, the Electronic Information and Communication Society of Japan, Vol. 74, No. 2, pp. 166 to 173 and Vol. 74, No. 3, pp. 271 to 279.

In this embodiment, the morphologic operation called "opening" is performed on the objective picture shown in FIG. 5 using the image shown in FIG. 4 as a constructive element. The opening operation is the basic operation in morphology and includes the erosion operation for scraping off a portion of the objective picture, which is superposed on the constructive element picture, starting from its end, and the dilation operation for shifting the objective picture by a distance corresponding to the scraped amount of the objective picture and laying the constructive element picture on the objective picture.

According to morphology, protruded portions and/or constricted portions of an objective picture are scraped off to deform a shape of the objective picture to a smooth shape when a circular constructive element is used. An area of the picture after deformation includes an area of the constructive element. Therefore, it is possible to use the area of the picture opening-operated by using the partial pattern as the constructive element, as the reference for determining whether or not the objective picture is a string of characters having serif, in lieu of the number of coincidences between the partial pattern and the image of the character string, which is obtained by the pattern matching. This embodiment can be realized by introducing the area of the opening-operated objective picture into the degree of coincidence counter. Differentiation of the area of the objective picture after opening is performed with the size (certain constant length) of the constructive element picture shown in FIG. 4 is called "pattern spectrum" and it is also possible to obtain a ratio of the constructive element to the objective element by using the pattern spectrum.

Figure 7:
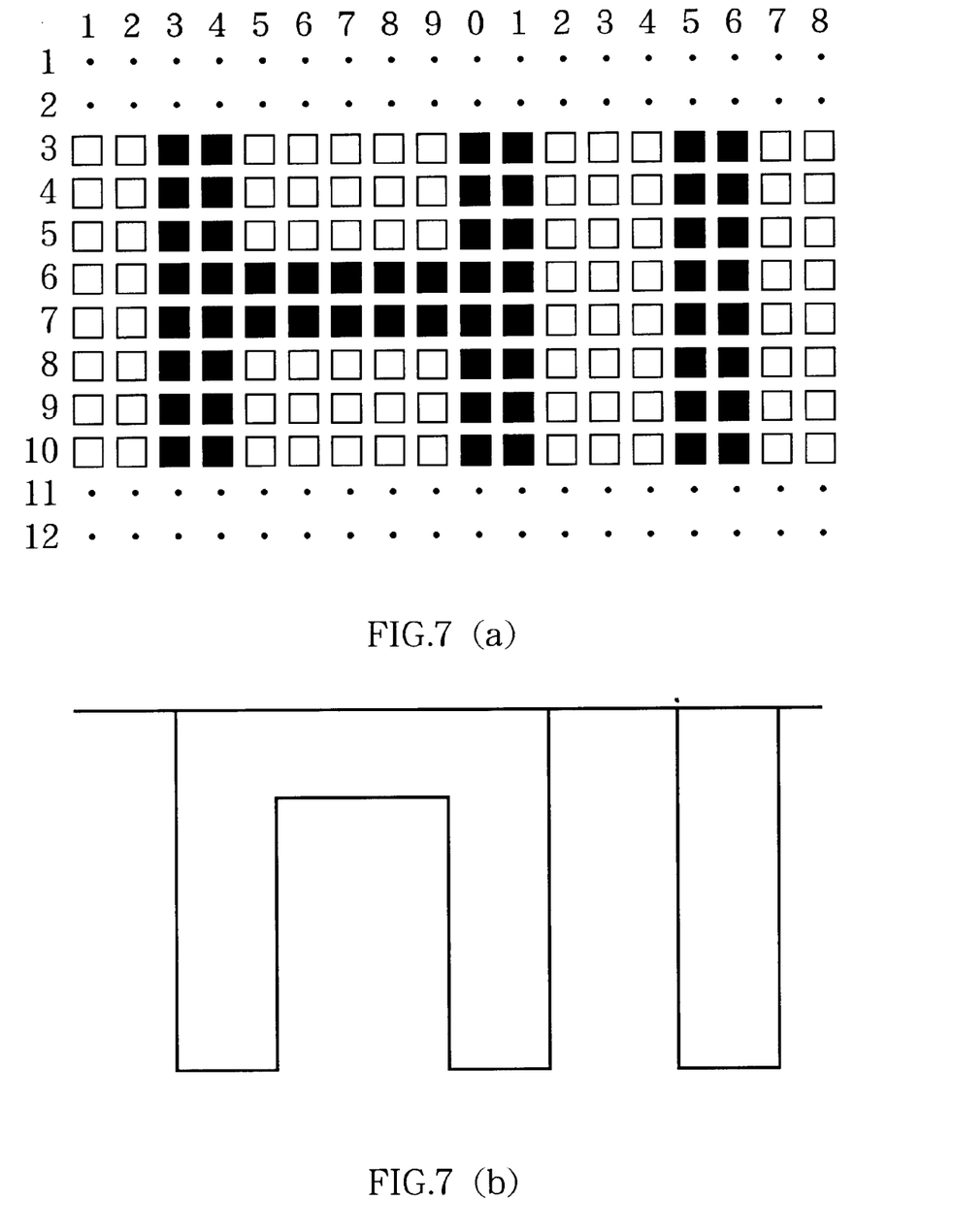

When the font of characters constituting the string is determined as one having serif, the masking is performed for the objective picture prior to the procedures for obtaining the character separating feature. A pattern of the mask is read out from the feature extraction inhibited area dictionary by using the font of the character as a search key. The masking can be executed by performing AND operation between the mask pattern and the image of the character string stored. For example, FIG. 7 is a masked image in a case where a mask pattern is defined such that "an upper and lower areas of an image, each corresponding to 2 pixels, are excluded from the character separating feature extracting area". In FIG. 7a, pixels depicted by dot points are removed by the mask pattern read out from the feature extraction inhibiting area dictionary.

The character separating feature can be extracted by obtaining a projection profile of the pixels and selecting locations at which values of the histogram are 0. Rectangular portions shown in FIG. 7b are histograms obtained by the projection of the character pixels. A portion of this histogram whose height is 0 can be selected as the character separating position.

The control of the whole operation can be performed by describing the processing and procedures mentioned above as a program and executing it by using a general purpose micro processor.

The control program is read from the recording medium 141 in the microprocessor (not shown) of the data processor (not shown) of the control unit 140 and controls the operation of the data processor. Under the control of the control program, the control unit 140 executes: the process for storing the electronic image of a character string obtained by; for example, optical scan into the image storing unit; the process for extracting areas of the image of the character string coincident with the partial pattern by means of the partial pattern detecting unit, and determining the font of characters on the basis of the position in which the partial pattern and the image of character string coincide with each other and the number of such coincidences by means of the character font determining unit, and the processing for detecting the separating position between the characters from the character separating feature using the character boundary position detecting unit by defining an area for extracting the character separating feature for respective fonts from the image of the character string according to the determined font of the character with reference to the feature extraction inhibited area dictionary for storing areas in which feature extraction processing is inhibited by means of the character separating feature extracting area defining unit.

It is easily understood that these processings can be realized by a software such as programs recorded on a recording medium 141.

Another embodiment of the present invention will be described. According to the procedures for calculating the degree of coincidence, another definition than that mentioned above can be employed. That is, the condition that "pixel values are coincident" in the counting procedure of the number of pixel locations of the pattern of character string and the partial pattern laid thereon at which pixel values are coincident is replaced by a condition that "a difference in pixel value between a character image of the partial pattern and a character image of the character string pattern, which is laid on the character image of the partial pattern, is within a constant value". The latter definition is effective in a case where the character string image and the partial pattern image are represented by equations each including a plurality of tones as parameters.

Although, in order to obtain the frequency of occurrence of the pixels of the partial pattern and the image of character string which are overlapping each other, the content of the degree of coincidence counter is used as it is, it is possible, when the area of the image of character string is various, to use a value obtained by dividing the content of the degree of coincidence counter by the area of the image of the partial pattern as a reference in lieu of the content of the degree of coincidence counter. Further, the divisor may be the number of character pixels (pixels other than those in the background) in the partial pattern image instead of the area of the partial pattern image.

According to the present invention, it is possible to reliably perform the character segmentation operation for a larger number of contact patterns than that capable by the conventional method without influence of the character touching condition, because the character separating feature is extracted from other area of the image of a character string than that in which there is a possibility of character contact.

Further, according to the present invention, there is no need of the redundant character segmentation processing for registering patterns of whole characters as reference characters and obtaining the correlation therebetween and the system is easily hardwared because the character segmentation is performed by determining the font of character by comparing the partial pattern indicative of the feature of the character font with the image of character string and extracting the separating feature extracting area corresponding to the character font. Therefore, it becomes possible to perform the character segmentation on a small size hardware at high speed.

What is claimed is:

1. A character segmentation apparatus for segmenting an electronic image of a character string containing a plurality of characters comprising:

a character font classifying unit for determining a font of said plurality of characters in said character string;

a character separating unit for separating a character from said plurality of characters based on said font of said plurality of characters; and a control unit for operating said units.

2. The apparatus of claim 1, wherein said font is classified using predetermined font keys, each font key being a partial pattern of a font.

3. The apparatus of claim 2, further comprising a font key dictionary containing said font keys.

4. The apparatus of claim 3, further comprising a font key detector for receiving said character string and at least one font key from said font key dictionary wherein said detector identifies number of times and positions of coincidence of said font key on said character string to determine said font of said character string.

5. The apparatus of claim 3, wherein said character separating unit further comprises a masking unit for outlining portions in said character string that are retained, and portions that are extracted from said character sting based on said font of said character string.

6. The apparatus of claim 5, wherein said character separating unit includes a mask dictionary containing masks, each mask defining a portion of a font to be retained, and wherein said masking unit obtains a mask from said mask dictionary corresponding to said font for outlining portions in said character string to be retained and portions that are to be extracted by said character separating unit.

7. The apparatus of claim 6, wherein said character separating unit further comprises an extracting unit for eliminating portions that are not retained by said masking unit to define separating positions between retained features in said character string.

8. The device of claim 7, further comprising a boundary detecting unit for specifying boundaries between characters in said character string based on said separating positions in said masked character string.

9. The apparatus of claim 8, wherein said boundary detecting unit specifies said separating positions by using a projection profile of said characters in said masked character string.

10. The apparatus of claim 9, wherein said projection profile is a histogram.

11. A character segmentation method for segmenting an electronic image of a character string containing a plurality of characters comprising the steps of:

determining a font of said character string; and separating a character from said plurality of characters based on said font of said character string.

12. A character segmentation method as claimed in claim 11, wherein said determining step is performed by matching a partial pattern of a font to said character string to identify said font of said character string.

13. A character segmentation method as claimed in claim 12, wherein said determining step is performed by a morphologic operation of a relation between said partial pattern and said character string.

14. A character segmentation method as claimed in claim 2, wherein said separating step is performed by using said font of said character string to isolate a characteristic portion in said character string and eliminating an area outside of said characteristic portion to define a separating position in said character string along which said character is separated.

15. The method of claim 12 wherein said matching is performed by identifying positions on said character string that coincide with said font key and a number of said identified positions.

16. The method according to claim 11, further comprising providing a partial pattern dictionary containing a plurality of partial patterns of fonts.

17. The method according to claim 14, wherein said characteristic portion is isolated by a font mask to provide a masked character string.

18. The method according to claim 17, wherein said font mask is predefined to correspond to said font of said character string.

19. The method according to claim 17, wherein said mask identifies characteristic portions in said characters, and further comprising retaining said characteristic portions and eliminating the remaining portions to define said separating positions.

20. The method according to claim 14, further comprising the step of detecting said separating position.

21. The method according to claim 20, wherein said detecting is performed by obtaining a projection profile of said masked character string and constructing a histogram from said projection profile in which zero corresponds to said separating position.

22. The method according to claim 17, wherein said font mask is obtained from a font mask dictionary.

23. The method according to claim 15, further comprising establishing that said font includes serifs when said number of times and positions exceed a predetermined number of times and positions, respectively.

24. A recording medium having recorded thereon a control program for segmenting out a character from an electronic image of a character string containing a plurality of characters read in through a control unit, the control program executing the procedures of determining a font for said character string; and separating a character from said plurality of characters based on said font of said character string.

* * * * *